3,324,788
BARBECUE CONSTRUCTION
Hazel M. La France, Hollywood, Calif.
(10171 Wells Ave., Riverside, Calif. 92503)
Filed Dec. 28, 1964, Ser. No. 421,384
1 Claim. (Cl. 99—389)

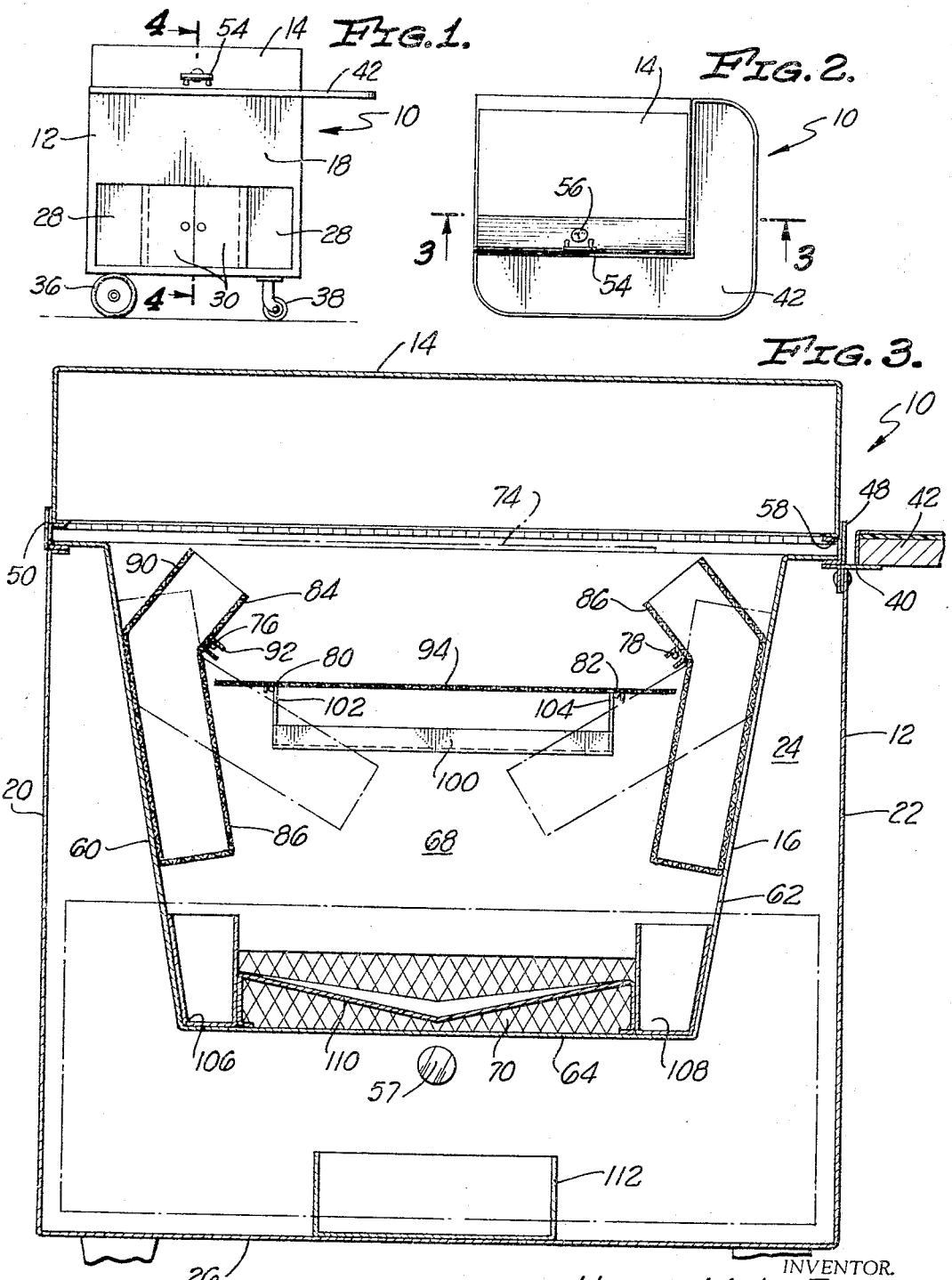

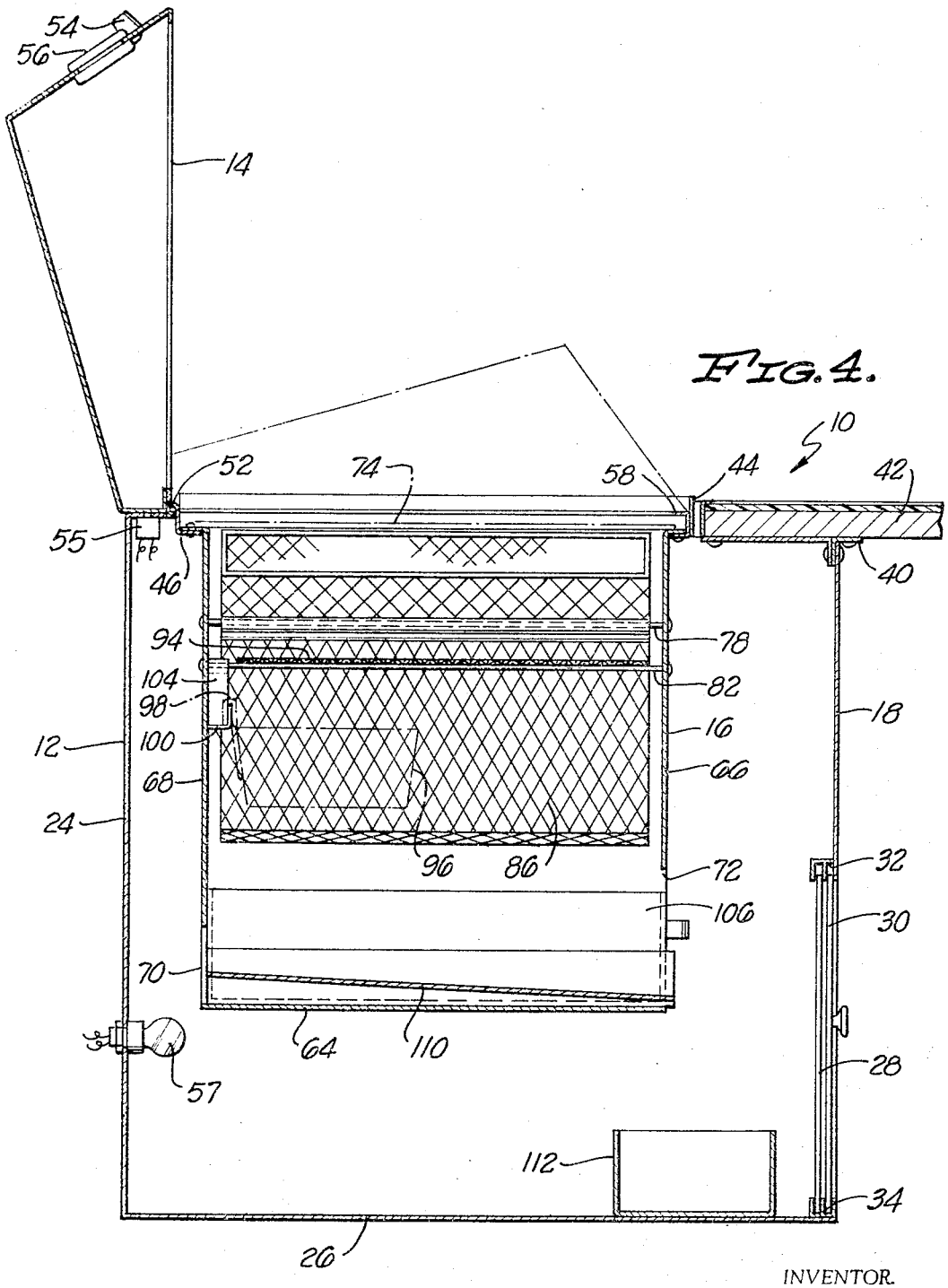

ABSTRACT OF THE DISCLOSURE

The barbecue cooker of this invention has an outer housing with interior walls with an insulated air space between. The barbecue has a top to control heated convective air and prevent its escape. Fire boxes lie on each of the sloping walls and a grill lies between the fire boxes. Heat from the fire boxes causes heating and rising of convective air which is returned through the center of the cooking compartment where the grill is located. Thus, the grill is located for convective cooking of materials. An ash receiver is provided to receive ashes from the fire boxes.

Background

This invention is directed to new improved barbecue construction. The term "barbecue" is used herein to designate structures which are intended to be used in the cooking of meat or like food materials by the direct action of heat emanating from a suitable heat source such as a charcoal or gas fire or an electrical heater.

Devices of this type are well known and are widely used because of the fact that various food products can be cooked in them so as to have a more desirable flavor. The more desirable flavor is attributed primarily to the proximity of the food to the fire in the barbecue structure with the consequent result that smoke and other volatile materials from the heat source condense upon the food material.

To some extent the present invention is predicated upon the discovery that satisfactory cooking with a barbecue type of cooker is not the mere consequence of applying heat to a food material in a more or less indiscriminate manner. In developing the present structure a number of facts have been observed which have led to the conclusion that satisfactory barbecue type of cooking of different kinds of food materials demand different forms of barbecue construction or different ways of applying heat and volatile reaction products to the food material. Furthermore, it has been observed that satisfactory barbecue cooking requires the ability in the barbecue structure to initially apply to meat and similar products a high temperature. This high temperature serves to sear the protein or other exterior portions of food material so as to at least partially seal in the natural juices within the food material. When such natural food materials are retained, they are present to react with the collagen in the food material in order to form gelatin. Reactions of this nature are commonly considered to be very desirable toward the tenderizing of the food material.

Accordingly, it is an object of this invention to provide a new and improved barbecue structure which is arranged to cook food materials in different manners depending on the nature of the food material and the type of cooking action desired.

It is another object of this invention to provide a barbecue which may be used indoors or out without smoking for drippage on the coals causes smoke and in this construction the coals are in substantially vertical receptacles away from the drippage.

It is another object of this invention to provide a barbecue structure which is constructed so as to utilize a minimum amount of fuel material and to which additional fuel material may be added as cooking progresses with a minimum amount of difficulty.

It is another object of this invention to provide a barbecue construction which has a cooking period of about six hours without diminishment of any heat whatsoever for the heat remains at a high temperature without adding additional fuel.

It is another object of this invention to provide a barbecue structure which can be easily and economically constructed so as to provide a structure with a long, trouble free life.

It is a further object of this invention to provide a barbecue structure in which a rotisserie and a motor are unnecessary inasmuch as the heat is reflected from all sides and all sides cook evenly at one time.

It is still another object of this invention to provide a barbecue structure which can be readily cleaned both with respect to the food preparation zones and the drippage therefrom as well as with respect to the removal of ashes resulting from the cooking fire.

Other objects and advantages of this invention will become apparent from the following portion of this specification, the attached claim and the accompanying drawings in which:

Description of the drawings

FIG. 1 is a front elevational view of a barbecue structure in accordance with this invention;

FIG. 2 is a top view thereof;

FIG. 3 is an enlarged section taken along the line 3—3 of FIG. 2 with parts broken away; and FIG. 4 is an enlarged section taken along the line 4—4 of FIG. 1 with parts broken away.

Summary

As an aid to understanding this invention it can be stated in essentially summary form that it is directed to a barbecue structure capable of adjustment so that food materials of different nature may be cooked in different manners. The barbecue construction has at least one fire basket in which fire is positioned, which fire basket is movable into different angular positions, from substantially vertical to substantially horizontal, with respect to the food product being cooked thereby. Furthermore, the fire basket is adapted to be fed with additional fuel, if desired, as the cooking progresses and an ash receptacle is provided so that ashes can readily fall from the fire basket to maintain a hot fire and yet the ashes can be easily removed from the barbecue structure from the front without loss of heat. Furthermore, selectivity of the position of the food product with respect to the fire basket is provided. A cool zone is maintained in the barbecue structure so that juices dripping from the food product can be caught and retained in the cool zone for use and to provide easy cleaning of the barbecue structure.

Description

This invention will be understood in greater detail by reference to the following portion of the specification wherein the drawings are referred to in detail. A barbecue structure is generally indicated at 10. The barbecue structure 10 primarily comprises a support and enclosure housing 12, cover 14 and cooking enclosure 16 positioned within housing 12.

Enclosure housing structure 12 comprises the main frame and enclosure to define the exterior configuration and support the interior parts of the barbecue structure 10. The housing 12 includes front 18, left side 20, right side 22, back 24 and bottom 26. The sides, back and bottom are completely enclosed while the front 18 carries front doors 28 and 30 which are slidable to an open position on tracks 32 and 34. Doors 28 and 30 permit access to the lower interior of housing 12 for access to the ash and grease pans, as is hereinafter described. Furthermore, doors 28 and 30 control the flow volume of air to the cooking fire. The housing 12 has suitable supports, such as legs, or such as wheels and casters 36 and 38, respectively, as is shown in FIG. 1.

Housing 12 has an outwardly extending angle 40 on at least one of its sides or front or back. As is seen in FIGS. 2, 3 and 4 the outwardly extending angle 40 is positioned along the top of front 18 and along the top of right side 22. Counter 42 is secured thereto and serves as an auxiliary area for the placement of condiments and tools associated with the barbecue cooking process. FIG. 2 shows the cutting board 42 on front and right for fitting into left corners. This may be placed on front and left for right corners, placed on both or all sides for convenience, or a larger drop-leaf attached on a desired side.

With the exception of the overhang of the counter 42 over the interior of housing 12 at the front 18 thereof, housing 12 is generally open at the top. The top opening is defined at the front, rear and ends by upwardly and inwardly extending angle, the front side of which is indicated at 44, the rear side of which is indicated at 46, the right end of which is indicated at 48 and the left end is indicated at 50. This angle is secured to the adjacent structure so as to define the opening and serve as a support for adjacent equipment. Cover 14 is hinged at 52 so that it may swing from the full line position of FIG. 4 to the dotted line position also shown therein. In the dotted line position it can be seen that the cover is within the confines of the various angles to completely close the opening defined thereby. Cover 14 is of raised dome structure and conveniently carries lift handle 54. Furthermore, the cover 14 can be provided with a temperature indicator 56 to indicate the temperature within the confines of cover 14, if desired. In view of the fact that it may be desirable to obtain some temperature regulation within the cover 14, the cover 14 can readily be provided with an adjustable support to adjustably maintain it at different slightly open positions. Thus, a different amount of heat confinement and circulation can be managed by variations in the amount of cover opening. The cover is arranged to close switch 55 when it is opened. Switch 55 then lights bulb 57 so that the interior of housing 12 is illuminated for convenience. The cover may be of any desired shape.

As is seen in FIGS. 3 and 4, channel 58 is positioned within the upwardly and inwardly extending angles 44, 48 and 50 so as to define a stop for the cover. Secured to the channel 58 and depending downwardly therefrom is the cooking enclosure 16. Cooking enclosure 16 has inwardly and downwardly sloping left and right ends 60 and 62, respectively, which are joined together by means of bottom 64. Furthermore, cooking enclosure 16 has front 66 and back 68 so as to define a substantially enclosed chamber which has a top opening corresponding to the top opening defined by channel 58 and the upwardly and inwardly extending angles. However, cooking enclosure 16 is open at its lower rear and has screen 70 inserted therein. Screen 70 permits the access of air from the interior of housing 12 to the interior of cooking enclosure 16. Furthermore, cooking enclosure 16 has opening 72 at its front which also permits the entry of air to the cooking enclosure.

Considering the cooking enclosure 16 from top to bottom, an open wire work grill 74, shown in dot-dash lines, may be optionally provided for certain varieties of cooking. Support bars 76, 78, 80 and 82 extend from the front 66 to the back 68 of the cooking enclosure 16 and are secured thereto by any convenient means such as riveting or welding. The support bars are parallel to the side and to the botom, and are arranged to suport various iinterior structure. Fire boxes 84 and 86 are respectively supported on support bars 76 and 78. Fire boxes 84 and 86 are symmetrical at the center line of the barbecue structure 10, so only fire box 84 need be described. Fire box 84 is made of such material suitable for the formation of fire box so that it has considerable open space. Thus, the material of fire box 84 is stamped sheet material, or woven wire material so that a maximum amount of air can get to the fuel within the fire box and the maximum amount of radiant energy can escape directly from the fuel without reference to or obstruction by the fire box structure.

Fire box 84 has a lower end 88 which is adapted to lie in one position along left end 60. Furthermore, the fire box has an upper end 90 which is angularly arranged with respect to the lower end so that the entire fire box 84 has a dog-leg appearance. Adjacent the juncture of the lower and upper ends, channel 92 is secured in such a position that the fire box 84 lies with its lower end 88 against the wall 60 when the channel 92 is engaged over support bar 76. Furthermore, the fire box 84 can be swung up into the dot-dash line position shown in FIG. 3 and have its upper end in engagement with end 60. Maintenance of these positions is accomplished by the positioning of channel 92 and support bar 76 with respect to the surfaces of the fire box 84 that bear against the left end wall 60, and the position of the left end 60 with respect to the support bar. Thus, latching into the two positions is accomplished because the outer corner of the dog-leg is not fully radiused and therefore the whole fire box 84 must move slightly away from the left end 60 for movement from one position to the other.

The movability of the fire boxes 84 and 86 into two positions permits different direction of application of radiant heat to the food product being cooked and permits different conditions for the condensation of combustion products upon the food products and thus varies the flavoring capability of the barbecue structure in accordance with the desires.

Support bars 80 and 82 have grill 94 positioned thereon. This grill is normally used in the cooking of meat products and its position is inter-related with the two positions of the selectively positionable fire boxes 84 and 86 as is shown in FIG. 3. Smaller food products, such as steaks, are normally cooked on grill 94. Grill 74 and grill 94 are preferably dimensioned so that one grill can alternatively be positioned in either of the indicated positions. However, if the food product is loose, such as peas or diced carrots, etc., one or more pans, such as pan 96, are useful for the cooking thereof. Pan 96 has a hook 98 at the upper rear thereof for engagement with angle 100 which is supported from support bars 80 and 82 by means of hooks 102 and 104. Pan 96 is suitable for larger food products such as roasts, and is also useful in the cooking of vegetables, especially the variety that need to be at least partially immersed in water for the proper temperature control of the cooking thereof.

Resting on the bottom 64 and respectively against the left and right side 60 and 62 are ash pans 106 and 108. These ash pans extend the full length, from front to back, of the cooking enclosure 16 and the opening 72 is of such dimension as related to the ash pans that the ash pans 106 and 108 can be directly withdrawn forwardly out of the enclosure 16 and out past the open doors 28 and 30. Ash pans 106 and 108 are of such dimension as to catch all the ashes that fall out of the fire boxes 84 and 86, when the fire boxes are in their lowered position. This arrangement, together with fire boxes of such nature as to pass out the ashes permits continuous fires. Such continuous fires are enhanced and made possible by the fact that the fire boxes 84 and 86 are open at their top end so that fuel may be added thereto at any time.

Between the ash pans and supported on the bottom 64 is drip funnel 110. Drip funnel 110 covers the entire remaining available area of bottom 64 and slopes toward the center and toward the front so that drippings from the cooking food product are caught and guided to drip into drip pan 112 positioned on bottom 26 inside of the doors. Both the drip pan 112 and drip funnel 110 are outside of the direct heat zone of the fires within the fire boxes and thus the descending food juices are not cooked thereon, and these parts remain easy to clean.

This invention having been described in its preferred embodiment, it can be clearly seen that it is susceptible to numerous changes and embodiments within the scope of the routine engineer without the exercise of the inventive faculty. Accordingly, the scope of this invention is defined by the scope of the following claim.

I claim:

In a barbecue cooker, said barbecue cooker comprising a housing formed of a heat resistant material, said housing having a generally box-like appearance and having an open top and a removable cover positionable to close said open top, the improvement comprising:
  slopping interior walls within said housing, said sloping interior walls being located between the sides of said housing and spaced from the ends of said housing so as to extend inwardly and downwardly from opposed ends of said housing, said sloping walls defining insulating end compartments and a center convective cooking compartment;
  perforate hollow racks positioned within said cooking compartment, each of said perforate hollow racks lying substantially against one of said sloping walls, said racks extending along said sloping walls, said racks having open upper ends through which combustible material may be inserted within said racks so that such combustible material causes hot air convection upward along said rack and when said top is closed, the heated convective air moves downward through the center of the cooking department;
  ash receiver means positioned below said racks so as to receive ash resulting from combustion of material in said racks;
  a horizontal grill for holding material to be cooked, said horizontal grill being located within said housing substantially parallel to the top thereof and being located beneath said top and beneath said sloping walls and between said racks, said horizontal grill being located with respect to said racks, so that material to be cooked placed upon said grill is located to receive a minimum of direct radiation from said racks and a maximum amount of downwardly flowing convected heated air when said top is closed so that material to be cooked is cooked substantially by heated air.

References Cited

UNITED STATES PATENTS

| | | |
|---|---|---|
| 2,441,190 | 5/1948 | Fuller. |
| 2,885,950 | 5/1959 | Stoll et al. _____ 99—340 |
| 2,923,229 | 2/1960 | Halford _____ 99—390 X |
| 3,018,772 | 1/1962 | Blazey _____ 99—340 X |
| 3,040,730 | 6/1962 | Hurko et al. _____ 126—25 |
| 3,122,134 | 2/1964 | Reeves. |
| 3,182,585 | 5/1965 | Rensch et al. _____ 99—390 X |

WALTER A. SCHEEL, *Primary Examiner.*

S. P. FISHER, *Assistant Examiner.*